United States Patent
Humpert

(10) Patent No.: US 10,051,924 B2
(45) Date of Patent: Aug. 21, 2018

(54) FASTENER ELEMENT FOR ATTACHMENT TO A COMPONENT, COMPONENT ASSEMBLY INCLUDING THE FASTENER ELEMENT AND METHOD FOR THE MANUFACTURE OF THE COMPONENT ASSEMBLY

(71) Applicant: PROFIL Verbindungstechnik GmbH & Co. KG, Friedrichsdorf (DE)

(72) Inventor: Richard Humpert, Bad Nauheim (DE)

(73) Assignee: PROFIL VERBINDUNGSTECHNIK GMBH & CO. KG, Friedrichsdorf (DE)

(*) Notice: Subject to any disclaimer, the term of this patent is extended or adjusted under 35 U.S.C. 154(b) by 702 days.

(21) Appl. No.: 14/532,511

(22) Filed: Nov. 4, 2014

(65) Prior Publication Data

US 2015/0121667 A1 May 7, 2015

(30) Foreign Application Priority Data

Nov. 6, 2013 (DE) .................. 10 2013 222 484

(51) Int. Cl.
*A44B 17/00* (2006.01)
*F16B 5/00* (2006.01)
(Continued)

(52) U.S. Cl.
CPC ...... *A44B 17/0064* (2013.01); *A44B 17/0041* (2013.01); *B23P 19/064* (2013.01); *F16B 5/0096* (2013.01); *F16B 5/045* (2013.01); *F16B 37/068* (2013.01); *Y10T 24/45906* (2015.01); *Y10T 29/49945* (2015.01)

(58) Field of Classification Search
CPC ....... B23P 19/06; B23P 19/062; B23P 19/064; F16B 37/068; F16B 5/0096
See application file for complete search history.

(56) References Cited

U.S. PATENT DOCUMENTS 2,144,831 A * 1/1939 Burns .................. F16D 69/022
192/107 R
2,347,049 A * 4/1944 Green .................. E04B 1/6137
403/331
(Continued)

FOREIGN PATENT DOCUMENTS

CN 1182653 A 5/1998
DE 4104804 A1 8/1992
(Continued)

OTHER PUBLICATIONS

Office Action regarding related CN App. No. 201410621146.8; dated May 2, 2017; 3 pgs.

*Primary Examiner* — Daniel J Wiley
(74) *Attorney, Agent, or Firm* — Cantor Colburn LLP

(57) ABSTRACT

A fastener element for attachment to a component, wherein the fastener element has a contact surface which contacts the component in the installed state. Furthermore, the fastener element has a mounting recess which faces the component in the dismantled state. The mounting recess is bounded by at least one sidewall and by a base section. The sidewall is, at least regionally, provided with at least one undercut which is effective in the axial direction of the fastener element. The base section is formed free of any aperture.

19 Claims, 5 Drawing Sheets

Figure 1:
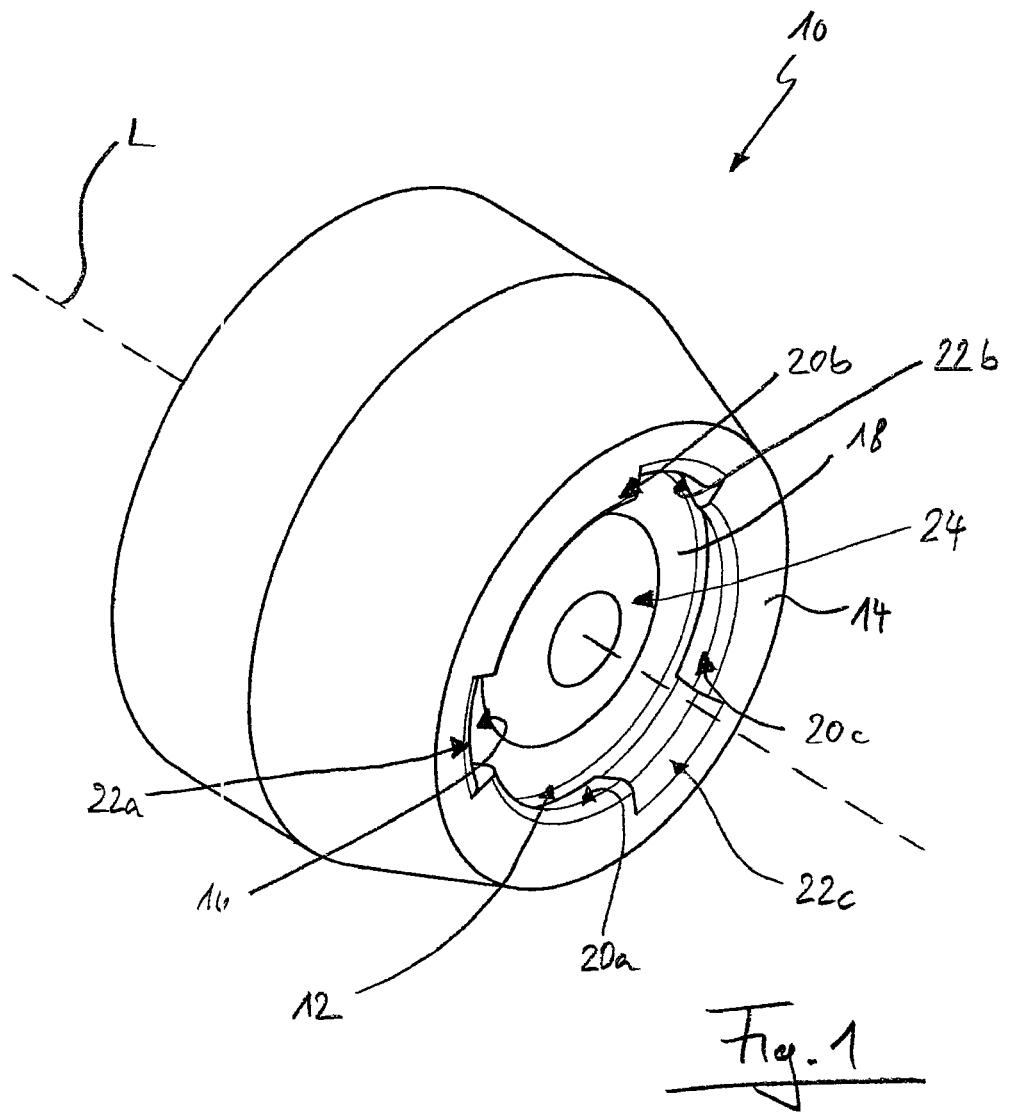

(51) Int. Cl.
*F16B 5/04* (2006.01)
*B23P 19/06* (2006.01)
*F16B 37/06* (2006.01)

(56) References Cited

U.S. PATENT DOCUMENTS

| | | | | |
|---|---|---|---|---|
| 3,817,264 | A | | 6/1974 | Kilayko |
| 4,359,294 | A | * | 11/1982 | Crillesen ............... F16B 5/0052 403/231 |
| 5,090,835 | A | * | 2/1992 | Cox .......................... A47G 1/10 40/782 |
| 5,145,149 | A | | 9/1992 | Moehle |
| 5,363,628 | A | * | 11/1994 | Basar ..................... E06B 3/277 264/249 |
| 5,782,594 | A | * | 7/1998 | Muller .................. B23P 19/062 411/176 |
| 6,004,087 | A | * | 12/1999 | Muller .................. B23P 19/062 411/107 |
| 6,146,072 | A | * | 11/2000 | Muller .................. B23P 19/062 411/176 |
| 6,257,814 | B1 | * | 7/2001 | Muller .................. B23P 19/062 411/176 |
| 6,732,431 | B2 | * | 5/2004 | Muller .................. B23P 19/062 29/432.2 |
| 6,986,629 | B2 | * | 1/2006 | Babej .................... B23P 19/062 411/179 |
| 7,819,268 | B2 | * | 10/2010 | Obergoenner ........... B65D 9/04 217/65 |
| 8,016,144 | B2 | * | 9/2011 | Obergoenner ........... B65D 9/04 217/65 |
| 9,249,823 | B2 | * | 2/2016 | Babej .................... F16B 37/068 |
| 9,764,371 | B2 | * | 9/2017 | Fujimoto ............... B21D 31/00 |
| 2004/0253051 | A1 | * | 12/2004 | Napp ..................... F16B 5/002 403/331 |

FOREIGN PATENT DOCUMENTS

| | | |
|---|---|---|
| DE | 10051126 A1 | 5/2001 |
| DE | 10156396 A1 | 5/2003 |
| DE | 10226668 A1 | 12/2003 |
| DE | 10256970 A1 | 6/2004 |
| EP | 0224308 A2 | 6/1987 |
| EP | 0759510 A1 | 2/1997 |
| WO | 2004020845 A1 | 3/2004 |
| WO | 2012038928 A1 | 3/2012 |

* cited by examiner

FASTENER ELEMENT FOR ATTACHMENT TO A COMPONENT, COMPONENT ASSEMBLY INCLUDING THE FASTENER ELEMENT AND METHOD FOR THE MANUFACTURE OF THE COMPONENT ASSEMBLY

The present invention relates to a fastener element for attachment to a component.

A plurality of fastener elements of customary design are introduced during the installation into a pre-manufactured hole in the component and are subsequently secured to it, for example by a riveting process. Another group of fastener elements is designed in such a way that they themselves punch a hole in the component during the attachment to the component. Subsequently, a section of the fastener elements is deformed in order to provide a reliable connection between the fastener element and the component.

Connections between these fastener elements and respective components are as a rule indeed very reliable. However, the said fastener elements must be provided with functional sections which enable a piercing of the component and/or a riveting of the fastener element. Such functional sections have a disadvantageous effect with regard to the weight of the fastener elements. Moreover, they require additional working steps during the manufacture of the corresponding fastener elements. Furthermore, the components must be perforated prior to or in the course of the attachment process which requires an additional working step, at least in the former case. The hole which arises represents a potential leakage point through which a gaseous and/or liquid medium can pass. In certain applications the connection between the fastener element and the component must be sealed by additional measures.

There is requirement for a novel concept which includes fastener elements that can be used in a diverse manner and that can be secured in a simple and reliable manner to a component without the seal nature of the component being compromised by the attachment of the element.

This object is satisfied by the respective subject matter of the independent claims.

The fastener element in accordance with the invention includes a fastener element having a contact surface which contacts the component in the installed state. Furthermore, the fastener element has a mounting recess which faces the component in the installed state. The mounting recess is bounded by at least one sidewall and by a base section. The sidewall is, at least regionally, provided with at least one undercut which is effective in the axial direction of the fastener element. The base section is formed free of any aperture.

In other words the fastener element has no components to form a piercing edge and/or which have to be inserted into a prepared hole of the component. On the contrary, the fastener element is provided with a recess which extends away from the contact surface into the interior of the element. The recess serves to receive material of the component, the material being pressed into the component for the attachment of the fastener element. The fastener element is prevented from being pressed out by the undercut provided at the at least one sidewall. For example, the undercut has a surface region which diverges in a direction away from the contact surface into the interior of the mounting recess so that material of the component which is pressed into the mounting recess and in this connection was pressed behind the undercut secures the fastener element to the component in the axial direction by means of a form fitted connection.

The undercut can for example be formed by a projection which projects from the sidewall into the interior of the recess, in particular in a radial direction in relation to the longitudinal axis of the fastener element.

As was already mentioned the base section is made free of any aperture. I.e. has no opening through which the interior of the recess stands in connection with the environment. In this way it is prevented that an excessive deformation of the component during the attachment of the fastener element leads to a perforation of the same. The base section thus forms an efficient restriction of the deformation of the component.

In accordance with one embodiment the base section is substantially planar. An embodiment of this kind can be simply realized from a technical manufacturing view point.

Alternatively, the base section has a raised portion projecting into the mounting recess which is set back in relation to a plane defined by a contact surface, i.e. the projection does not project beyond the mounting recess. It contributes to the fact that the material of component is deformed in a controlled manner during the attachment of the fastener element. For example, the shape of the raised portion is selected such that at least one part of the material of the component pressed into the recess is deflected behind the undercut. The raised portion does not have to be particularly high in order to satisfy the above described purpose. The height of the raised portion is preferably less than 50% and in particular less than 40% of a depth of the mounting recess.

The raised portion can be arranged coaxial to the longitudinal axis of the fastener element and/or centrally in the base section. In particular, the raised portion is of conical shape, at least regionally, in order to satisfy the function of deflecting the material of the component in a uniform manner.

The basic shape of the mounting recess can essentially have the shape of a shallow cylinder. In particular the basic shape of a shallow, flat circular cylinder so that the mounting recess is of substantially circular shape in a cross-section perpendicular to a longitudinal axis of the fastener element. However, it is basically also possible to provide a mounting recess having an oval, triangular, four-cornered or multi-cornered (polygonal) cross-section. Irregular shapes of the cross-section are also conceivable. Shapes which are provided with a cross-section which differs from a circular shape are inherently secured against rotation.

The term "basic shape" does not preclude the sidewall/the sidewalls of the recess and the base section being provided with raised portions and recesses.

The contact surface can be in the shape of ring, in particular circular. It is in particular made free of recesses so that it essentially defines a single plane. In this way it is distinguished from the contact surfaces of known fastener elements which are depressed at least regionally during manufacture for the formation of undercuts, so that local recesses arise.

It is basically possible to provide the entire sidewall or all sidewalls with a (circumferentially extending) undercut. In accordance with one embodiment the sidewall however has a plurality of undercut regions which are in particular regularly distributed. Furthermore, the sidewall includes sections which are made free of undercuts. The undercut regions and the regions which are free of undercuts can be arranged alternatively. Under the term an undercut-free region has to be understood a sidewall region which extends parallel to the longitudinal axis of the fastener element or as a diverging shape from the base section to the opening of the mounting recess.

The fastener element can be made symmetrical to a longitudinal axis of the fastener element. For example, the fastener element can be rotationally symmetrical or has the shape of the body of revolution. Alternatively or additionally, the fastener element can be made symmetrical to the plane which extends perpendicular to a longitudinal axis of the fastener element. For example, the fastener element can have a mounting recess at both axial end faces. A symmetrical design of the fastener element facilitates its handling, in particular the supply of the element to a machine for attachment of the secured component. Although a symmetrical design is preferred the fastener element can also be provided with differently designed mounting recesses at the axial end faces and/or be made asymmetrical with respect to the external geometry.

As was already explained above a security against rotation can be achieved at the fastener element secured to the component by a special shaping of the cross-section of the mounting recess. Additionally or alternatively, the features providing security against rotation can also be present which are provided at the sidewall and/or at the base section. Features providing security against rotation can for example be ribs and/or recesses which extend in the radial and/or axial direction in relation to the longitudinal axis of the fastener element.

The invention furthermore relates to a component assembly comprising a fastener element in accordance with at least one of the above-described embodiments and a component which is in particular in plate form. The material of the component is pressed free of any aperture into the mounting recess so that it is pressed—optionally in conjunction with the optional raised portion—behind the undercut and engages behind this to form a form-fitted connection. As a result of the deformation of the component in a manner free of any aperture which can in turn be attributed to the corresponding design of the base section of the fastener element, the sealed nature of this is not compromised. In other words, no apertures are produced in the component during the attachment of the fastener element to the component which would permit a passage of a gaseous and/or liquid medium.

Moreover, a method for the manufacture of the above-described component assembly is set forth, wherein a fastener element in accordance with at least one of the above-described embodiments is brought into contact with a component, in particular a component in plate form. In accordance with the invention material of the component is pressed by means of a die button into the mounting recess so that a part of the material engages behind the undercut.

In accordance with an embodiment of the method the die button is essentially cylindrical and has a slightly convergent cross-section. It will be understood that the shaping of the die button is matched to the cross-sectional geometry and/or the depth of the mounting recess.

The fastener element is preferably secured to a component in plate form. However, other applications are conceivable. For example, the component can also be a further fastener element of the same or similar construction. For this purpose, an intermediate piece is set forth in accordance with the invention for the manufacture of a component assembly, with the intermediate piece having a first fastener element in accordance with at least one of the previously described embodiments and a second fastener element in accordance with at least one of the above-described embodiments. The intermediate piece has a first coupling section which can be received in the mounting recess of the first fastener element. Furthermore, the intermediate piece has a second coupling section which can be received in the mounting recess of the second fastener element. The first and the second coupling sections are each respectively provided with an undercut which is suitable for collaborating with the respective undercut of the corresponding mounting recess.

In other words, the intermediate piece serves as a type of adapter for the coupling of two fastener elements which can be identical or different. Decisive is that the intermediate piece has suitable coupling sections for the respectively present mounting recess. It is particularly advantageous when the fastener element or at least their mounting recesses are the same since the intermediate piece can then eventually indeed be made symmetrical—at least with respect to the coupling sections.

The intermediate piece is in particular made symmetrical to a central plane which extends perpendicular to a longitudinal axis of the component assembly or to a coupling axis of the fastener elements.

In accordance with one embodiment of the intermediate piece the first coupling section stands directly in connection with a second coupling section, i.e. no central part is present which spatially separates the two coupling sections from one another. The corresponding intermediate piece is thus very compact. However, a spatially separating central part can fundamentally be provided whereby the intermediate space could for example be used as a spacer.

The intermediate piece can have a constriction in a plane perpendicular to a longitudinal axis of the component assembly or to the coupling axis of the fastener elements. For example the two coupling sections are conical elements, the converging ends of which are connected together so that the intermediate piece reminds one—pictorially expressed—to a diabolo in cross-section. The material of the intermediate piece, or the geometrical design of the undercuts of the coupling sections are so designed that the coupling sections can be introduced with elastic deformation of the undercuts of the coupling sections and/or of the fastener elements into the corresponding recesses.

The invention furthermore relates to a component assembly comprising a first fastener element in accordance with at least one of the above-described embodiments and a second fastener element in accordance with at least one of the above-described embodiments, with the first fastener element and the second fastener element being coupled together by an intermediate piece in accordance with at least one of the above-described embodiments. The contact surfaces of the first fastener element and the contact surface of the second fastener element are in particular in direct contact with one another.

Further embodiments of the invention are set forth in the claims, in the description and in the drawings.

Figure 2A:
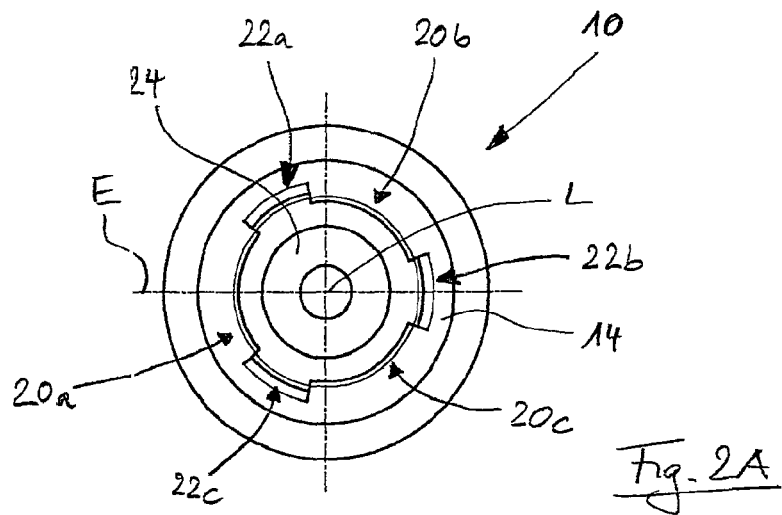
Figure 2B:
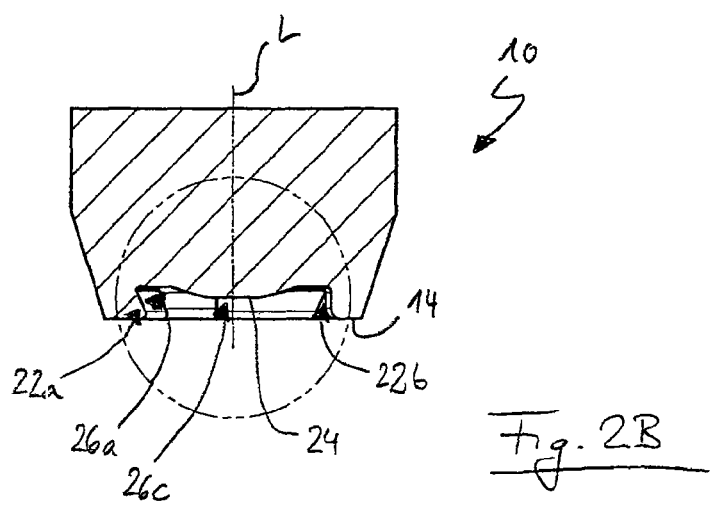
Figure 2C:
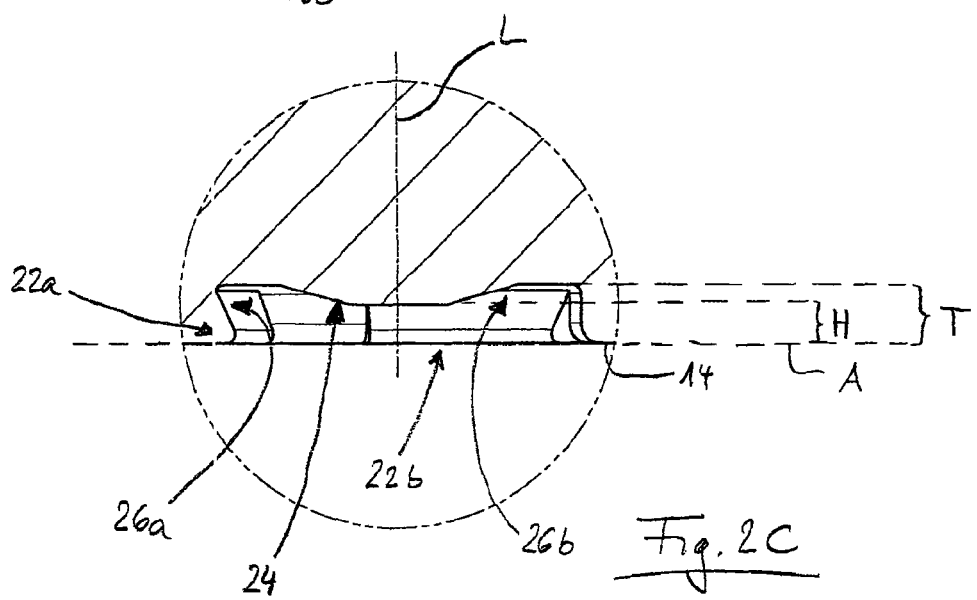
Figure 3A:
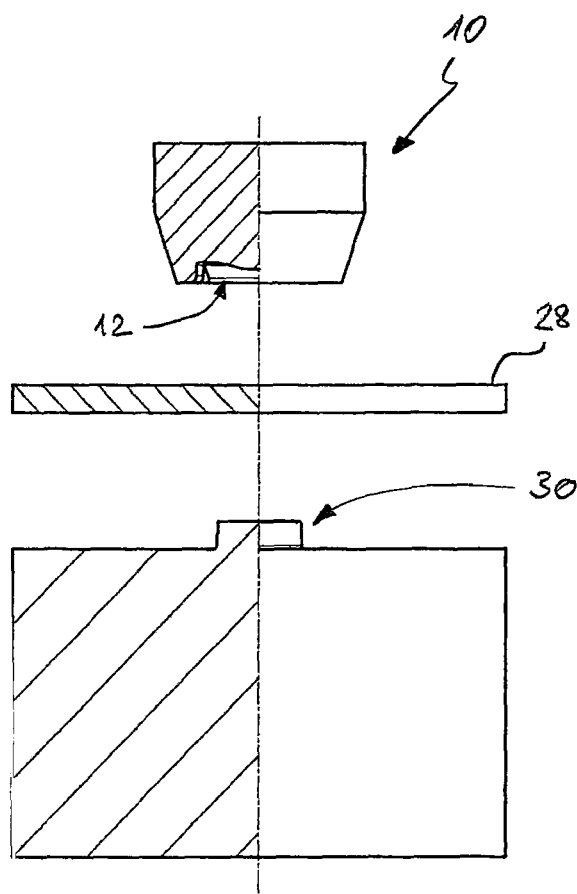
Figure 3B:
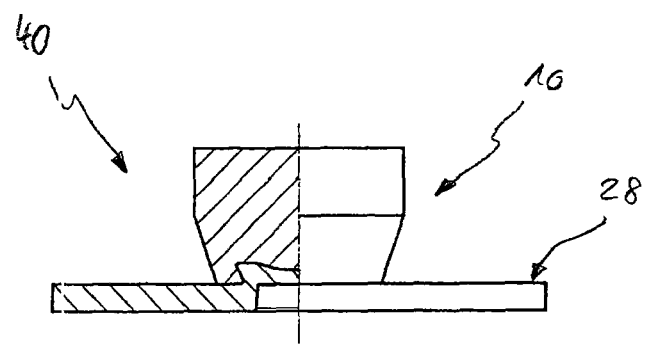
Figure 4A:
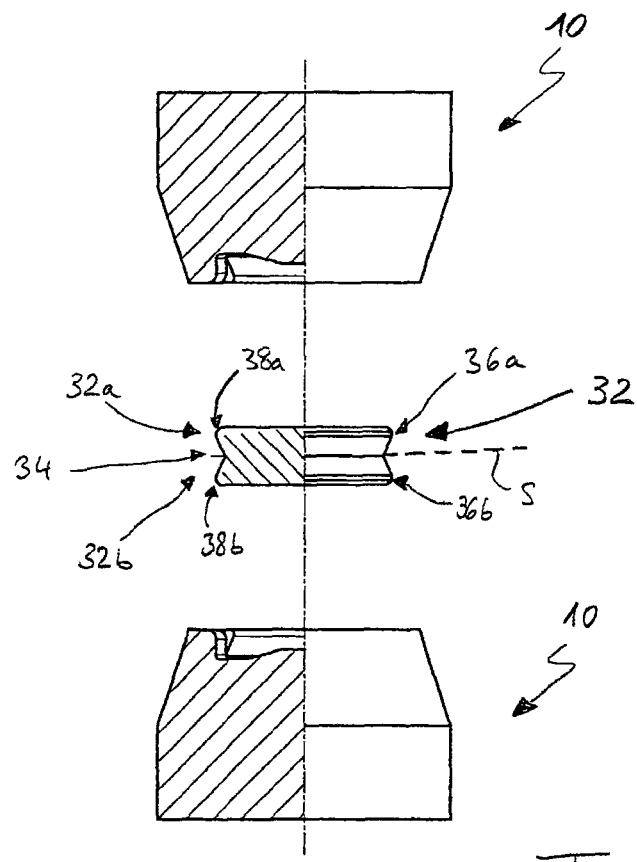
Figure 4B:
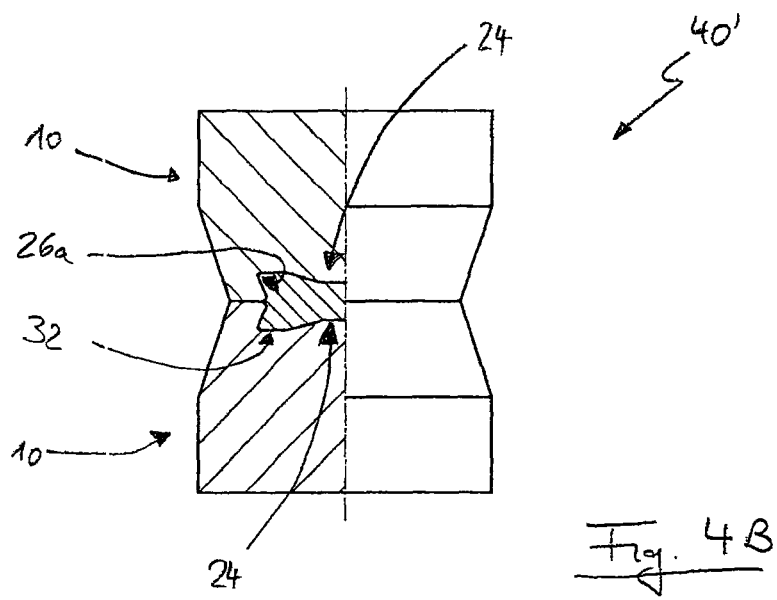
Figure 5:
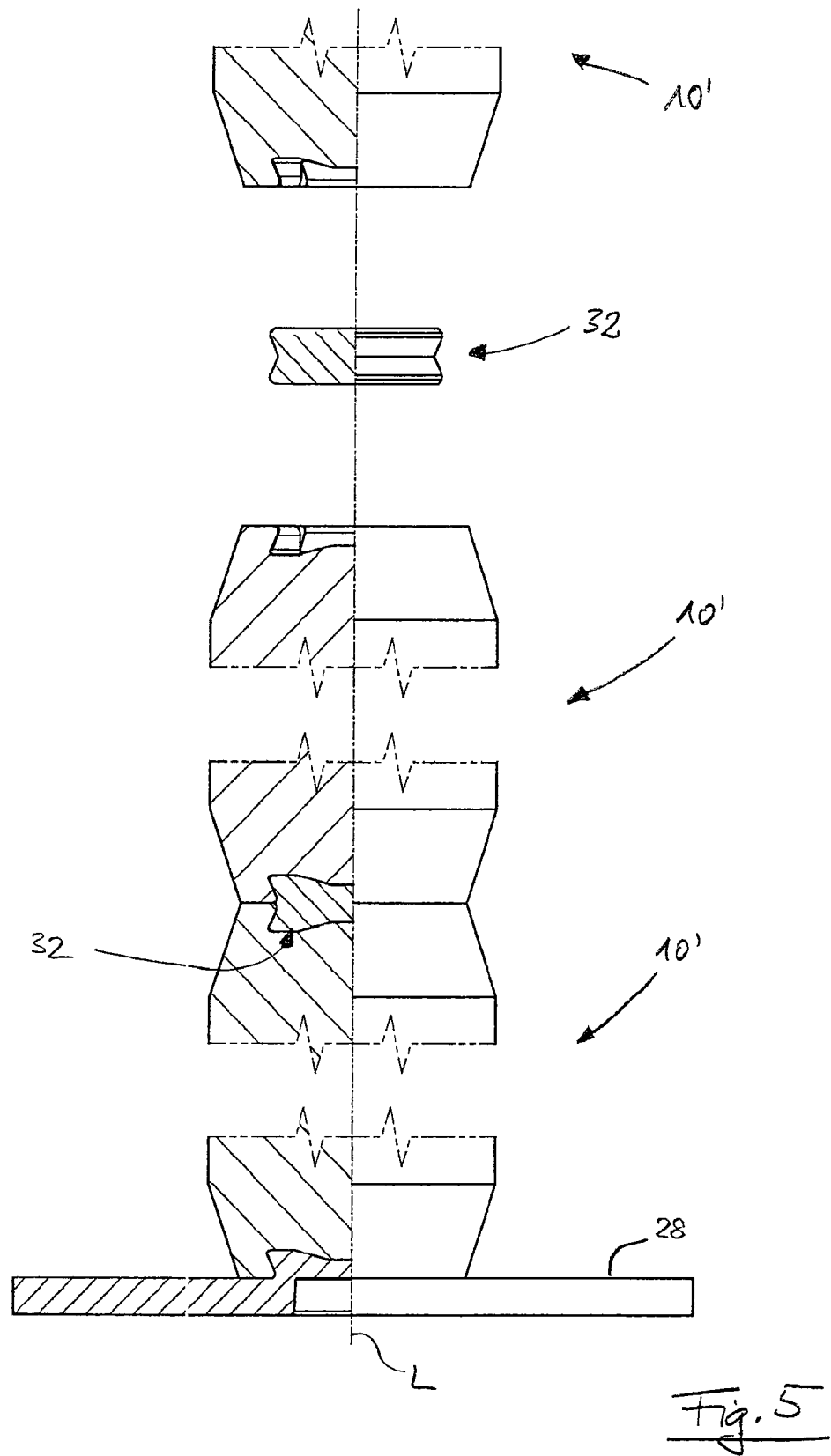

In the following the present invention will be explained purely by way of example with reference to advantageous embodiments and to the accompanying drawings. There are shown:

FIG. 1 a perspective view of an embodiment of the fastener element of the invention, FIG. 2A an axial view of the end face of the fastener element confronting the component, FIG. 2B a sectional view through the fastener element of FIG. 1, FIG. 2C an enlarged view of a part of FIG. 2B, FIG. 3A a fastener element in accordance with FIG. 1 and a complementary die button for the attachment of the fastener element to a sheet metal part, FIG. 3B the fastener element in accordance with FIG. 1 in an installed state, FIG. 4A two fastener elements and an intermediate piece provided for their coupling, FIG. 4B the two fastener elements of FIG. 4A in a coupled state, and FIG. 5 a combination of a plurality of fastener elements which are coupled to one another and to a planar component.

FIG. 1 shows a fastener element 10 having a mounting recess 12 which faces the component, for example a sheet metal part, to which the fastener element 10 is to be secured. The mounting recess 12 is bounded by a peripherally extending sidewall 16 and a base section 18. A contact surface 14 in the shape of a ring forms the component side end face of the element 10. During and after the installation of the fastener element 10 at the component it lies contacting the component.

The external geometry of the fastener element 10 and the design of the contact surface 14 can be freely selected and thus matched to the respectively present requirements.

Projections 20a, 20b, 20c project from the sidewall 16 in the radial direction into the interior of the mounting recess 12 towards a longitudinal axis L of the fastener element 10. The projections 20a, 20b, 20c, which are substantially of wedge-shape in cross-section, form undercuts the design of which will be explained in more detail in the following. Between the projections 20a, 20b, 20c respective undercut-free regions 22a, 22b, 22c are provided. The sidewall 16 has a substantially parallel extent with regard to the longitudinal axis L in the vicinity of the regions 22a, 22b, 22c.

A raised portion 24 extends from the base section 18 coaxially to the longitudinal axis L and has a substantially conical shape. It should be noted that the raised portion 24 does not project beyond a plane defined by the contact surface 14, but is rather set back relative to the latter. In other words, it does not project beyond the set plane into the external space.

FIG. 2A shows an axial view of the fastener element 10 perpendicular to the contact surface 14, whereby the rotationally symmetrical design of the fastener element 10 in relation to the longitudinal axis L becomes clear. The rotational symmetry (triple symmetry) is characterized by the alternating arrangement of the projections 20a, 20b, 20c and the undercut-free regions 22a, 22b, 22c. The raised portion 24 is in contrast essentially rotationally symmetrical. Since the raised portion serves, amongst other things, during attachment of the fastener element 10 to a component, to force material behind the projections 20a, 20b, 20c, provision can also be made for the raised portion not to be rotationally symmetrical, but rather to be rotationally symmetrical. Another form of regular or irregular design of the raised portion 24 is also basically conceivable.

FIG. 2B shows a side view through the fastener element 10 in a section plane E indicated in FIG. 2A.

FIG. 2C shows an enlarged view of the region marked by a circle in broken lines in FIG. 2B. It shows, when viewed in conjunction with FIG. 2A once again clearly that the contact surface 14 has no recesses or raised portions so that a single contact plane A is defined. Provision can however basically be made for the contact surface 14 to have raised portions and/or recesses which for example bring about a security against rotation. A security against rotation is however preferably achieved by other measures. Having regard to the fastener element 10 the security against rotation is achieved by an alternating arrangement of the projections 20a, 20b, 20c and undercut-free regions 22a, 22b and 22c. However, radial and/or axial ribs and/or recesses could basically also be provided at the base section 18 and/or at the sidewall 16 which prevent a rotation of the fastener element 10 in an installed state.

FIG. 2C further makes it clear that the projections 20a, 20b form undercuts 26a, 26b. The undercut formed by the projection 20c cannot be seen in the side view that is shown.

Moreover, it should be recognized that a height H of the raised portion 24, i.e. the spacing between its highest point and the base section 18 is substantially smaller than a depth T of the mounting recess 12 which is defined by the spacing between the contact plane A and the base section 18.

FIG. 3A makes the method for the attachment of the fastener element 10 in accordance with FIG. 1 to a sheet metal part 28 clear. For this purpose a substantially cylindrical die button 30 is provided. One moves the fastener element and the die button 30 towards one another and the region of the sheet metal part 28 is pressed by the action of the die button 30 into the mounting recess 12. The raised portion 24 thereby causes a part of the material of the sheet metal part to be pressed behind the undercuts 26a, 26b in order in this way to generate a reliable form-fitted connection between the fastener element 10 and the sheet metal part 28. The reshaping of the sheet metal part which occurs in the course of the attachment process is thus a massive forward flow pressing operation.

FIG. 3B shows a component assembly 40 of the element 10 and of the sheet metal part 28 which was manufactured by the above-described method.

FIG. 4A shows two fastener elements 10 and also an intermediate piece 32 by which the two elements 10 can be coupled to one another. The intermediate piece 32 includes two conical coupling sections 32a, 32b which have in a sectional view (left hand side) in each case a substantially trapezoidal cross-section. The coupling sections 32a, 32b are in direct contact with one another in a plane of symmetry S so that a constriction 34 is formed. The circumferential geometry of the intermediate piece 32 is adapted to that of the mounting recess 12 so that an introduction of the respective coupling section 32a, 32b into the corresponding mounting recess of the respective element 10 is possible. In this connection the projections 20a, 20b, 20c and/or outer edges 36a, 36b of the coupling sections 32a, 32b are essentially only elastically deformed. After the conclusion of the process of introduction the coupling sections 32a, 32b cooperate in form-fitted manner with the undercuts 26a, 26 of the two elements 10 in order to reliably couple these to one another. In order to facilitate the introduction of the intermediate piece 32 the coupling sections 32a, 32b are each provided with an introduction ramp 38a, 38b respectively. Moreover, the edges bounding the mounting recess 12 are rounded.

FIG. 4B shows a component assembly 40' which has been made from the components shown in FIG. 4A. The raised portions 24 of the fastener elements 10 have led to a deformation of the intermediate piece 32, with a part of the material of the intermediate piece having been pressed additionally behind the undercuts 26a, 26b in order to make the connection between the elements 10 even firmer. In certain applications it can however be possible to dispense with the raised portions 24.

The shaping of the intermediate piece 32 and of the coupling sections 32a, 32b and also the choice of the material of the intermediate piece 32 is to be matched to the shaping of the projections 20a, 20b, 20c and to the hardness of the material of the fastener element 10 in order to enable a "snapping into place" of the intermediate piece without the projections 20a, 20b, 20c and/or the outer edges 36a, 36b being sheared off.

FIG. 5 signifies the versatility of the fastener element in accordance with the invention. One embodiment 10' of the fastener element is—in a similar manner to FIG. 3B—connected to a sheet metal part 28. The fastener element 10' is symmetrically built up with respect to a plane which extends perpendicular to the longitudinal axis L. In other words the two end faces of the fastener element 10' have an identically constructed mounting recess 12. This design permits the fastener element 10' coupled to the sheet metal part 28 to be coupled to a further fastener element 10' which can in turn be coupled to a third fastener element 10'. In this way, intermediate pieces 32 are used which were described above with respect to FIGS. 4A and 4B. Apparently, a chain of coupled fastener elements 10' of any desired length can be produced. Basically it is also possible to couple the fastener elements which are of different shape to one another should this be necessary. The use of like and in particular symmetrical fastener elements is however preferred for cost and handling reasons.

The non-illustrated central sections of the fastener element 10' can be of any desired shape and can, if required, have different sections which satisfy specific functions.

In distinction of the above described embodiments the sidewall 16 can also have a circumferentially extending projection, i.e. the undercut-free regions 22a, 22b, 22c can be omitted. As was already mentioned in the introduction it is also possible to provide a non-circular basic shape of the cross-section of the mounting recess 12 in order to bring about a security against rotation.

REFERENCE NUMERAL LIST 10, 10' fastener element
12 mounting recess
14 contact surface
16 sidewall
18 base section
20a, 20b, 20c projection
22a, 22b, 22c undercut-free region
24 raised portion
26a, 26b undercut
28 sheet metal part
30 die button
32 intermediate piece
32a, 32b coupling section
34 constriction
36a, 36b outer edge
38a, 38b introduction ramp
40, 40' component assembly
L longitudinal axis
E section plane
A contact plane
H height
T depth
S planar symmetry

The invention claimed is:

1. A fastener element for attachment to a component, the fastener element having a contact surface that contacts the component in an installed state and having a mounting recess facing the component in the installed state; the mounting recess being bounded by at least one sidewall and by one base section, with the sidewall being provided, at least regionally, with an undercut which is effective in an axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion.

2. The fastener element in accordance with claim 1, wherein the raised portion has a height which is less than 50% of a depth (T) of the mounting recess (12).

3. The fastener element in accordance with claim 1, wherein the raised portion is arranged coaxial to a longitudinal axis of the fastener element and/or is arranged centrally in the base section.

4. The fastener element in accordance with claim 1, wherein the mounting recess has essentially the shape of a shallow cylinder.

5. The fastener element in accordance with claim 1, wherein the contact surface is in the shape of a ring.

6. The fastener element in accordance with claim 1, wherein the contact surface is made free of recesses so that it defines a single plane.

7. The fastener element in accordance with claim 1, wherein the sidewall has a plurality of undercut regions and regions which are free of undercuts.

8. The fastener element in accordance with claim 1, wherein the fastener element is made symmetrical with respect to a longitudinal axis of the fastener element.

9. The fastener element in accordance with claim 1, wherein the fastener element is made symmetrical with respect to a plane which is arranged perpendicular to a longitudinal axis of the fastener element.

10. The fastener element in accordance with claim 1, wherein the sidewall and/or the base section has features providing security against rotation.

11. A component assembly comprising a fastener element and a component, the fastener element having a contact surface that contacts the component and a mounting recess facing the component; the mounting recess being bounded by at least one sidewall and by one base section, with the sidewall being provided, at least regionally, with an undercut which is effective in the axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, wherein the material of the component is pressed free of any aperture into the mounting recess and a part of the material engages behind the undercut.

12. A method for the manufacture of a component assembly comprising a component and a fastener element having a contact surface that contacts the component in an installed state and having a mounting recess facing the component in the installed state; the mounting recess being bounded by at least one sidewall and by one base section, with the sidewall being provided, at least regionally, with an undercut which is effective in the axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, wherein the fastener element is brought into contact with the component, and wherein material of the component is pressed into the mounting recess by means of a die button so that a part of the material engages behind the undercut.

13. The method in accordance with claim 12, wherein the die button is at least substantially cylindrical.

14. An intermediate piece for the manufacture of a component assembly comprising a first fastener element, a second fastener element and the intermediate piece, the first fastener element having a contact surface that contacts the intermediate piece in an installed state and having a mounting recess facing the intermediate piece in the installed state; the mounting recess being bounded by at least one sidewall and by one base section, with the sidewall being provided, at least regionally, with an undercut which is effective in an axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, and a second fastener element having a contact surface that contacts the intermediate piece in an installed state and having a mounting recess facing the intermediate piece in the installed state; the mounting recess being bounded by at least one sidewall and by one base section, with the sidewall being provided, at least regionally, with an undercut which is effective in the axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, wherein the intermediate piece comprises:
  a first coupling section that can be received in the mounting recess of the first fastener element; and
  a second coupling section that can be received in the mounting recess of the second fastener element, wherein the first and the second coupling sections each have at least one undercut with the undercuts being suitable to cooperate with the respective undercut of the corresponding mounting recess.

15. The intermediate piece in accordance with claim 14, wherein the intermediate piece is symmetrical to a central plane which is arranged perpendicular to a longitudinal axis of the component assembly or to a coupling axis of the fastener elements.

16. The intermediate piece in accordance with claim 14, wherein the first coupling section and the second coupling section are directly in connection with one another.

17. The intermediate piece in accordance with claim 14, wherein the intermediate piece has a constriction in a plane perpendicular to a longitudinal axis of the component assembly or of a coupling axis of the fastener elements.

18. A component assembly including a first fastener element having a contact surface that contacts an intermediate piece in an installed state and having a mounting recess facing the intermediate piece in the installed state; the mounting recess being bounded by at least one sidewall and by one base section, with the sidewall being provided, at least regionally, with an undercut which is effective in the axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, and a second fastener having a contact surface that contacts the intermediate piece in an installed state and having a mounting recess facing the intermediate piece in the installed state; the mounting recess being bounded by at least one sidewall and by one base section, with the sidewall being provided, at least regionally, with an undercut which is effective in the axial direction of the fastener element; and wherein the base section is formed free of any aperture, the base section having a raised portion projecting into the mounting recess, the raised portion set back in relation to a plane defined by the contact surface, a radially outer side of the raised portion conically shaped from the base section to an axial end of the raised portion, wherein the first fastener element and the second fastener element are coupled to one another by the intermediate piece having a first coupling section that can be received in the mounting recess of the first fastener element and having a second coupling section that can be received in the mounting recess of the second fastener element, wherein the first and the second coupling sections each have at least one undercut with the undercuts being suitable to cooperate with the respective undercut of the corresponding mounting recess.

19. The component assembly in accordance with claim 18, wherein the contact surface of the first fastener element and the contact surface of the second fastener element stand in direct contact with one another.

* * * * *